(12) United States Patent
Zimmer et al.

(10) Patent No.: US 6,460,780 B1
(45) Date of Patent: Oct. 8, 2002

(54) SPRAY NOZZLE FOR A WINDSCREEN WASHING SYSTEM

(75) Inventors: Joachim Zimmer, Sasbach; Claus Fleischer, Buehl, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/700,567

(22) PCT Filed: Mar. 11, 2000

(86) PCT No.: PCT/DE00/00771

§ 371 (c)(1),
(2), (4) Date: Jan. 2, 2001

(87) PCT Pub. No.: WO00/56583

PCT Pub. Date: Sep. 28, 2000

(30) Foreign Application Priority Data

Mar. 23, 1999 (DE) .......................... 199 12 975

(51) Int. Cl.⁷ ................................ B05B 1/10
(52) U.S. Cl. .................. 239/284.1; 239/284.2
(58) Field of Search ................. 239/284.1, 284.2; 137/846, 844, 847

(56) References Cited

U.S. PATENT DOCUMENTS

| | | | | |
|---|---|---|---|---|
| 996,588 A | * | 6/1911 | Kennedy | 137/846 |
| 3,008,649 A | * | 11/1961 | Bock et al. | 239/284.1 |
| 3,237,616 A | * | 3/1966 | Daigh et al. | 137/846 |
| 3,730,217 A | * | 5/1973 | Gute | 137/846 |
| 3,955,594 A | | 5/1976 | Snow | |
| 4,846,836 A | * | 7/1989 | Reich | 137/846 |
| 6,155,299 A | * | 12/2000 | Martin | 239/284.1 |

FOREIGN PATENT DOCUMENTS

| | | | | |
|---|---|---|---|---|
| DE | 697 886 | | 10/1940 | |
| DE | 11 06 622 A | | 10/1959 | |
| DE | 1800013 | * | 5/1969 | 239/284.1 |
| DE | 34 33 091 A1 | | 3/1986 | |
| DE | 19744040 | * | 4/1999 | |
| DE | 198 15 171 A1 | | 6/1999 | |
| EP | 0 908 651 A | | 4/1999 | |
| FR | 1 251 901 A | | 4/1961 | |
| FR | 2 781 743 A | | 2/2000 | |
| WO | 98 01689 A | | 1/1998 | |

OTHER PUBLICATIONS

Bosch Handelsprogramm 97/98, p. 29.

* cited by examiner

Primary Examiner—Lesley D. Morris
Assistant Examiner—Dinh Q Nguyen
(74) Attorney, Agent, or Firm—Michael J. Striker

(57) ABSTRACT

A spray nozzle (10, 50, 68, 70) for a window or glass washer system has a closure element (14) with an elastic admission opening, which is opened by the pressure of the washing water. The closure element (14) is disposed in the water inlet upstream of a nozzle (32) having a fixed spray port (20).

5 Claims, 2 Drawing Sheets

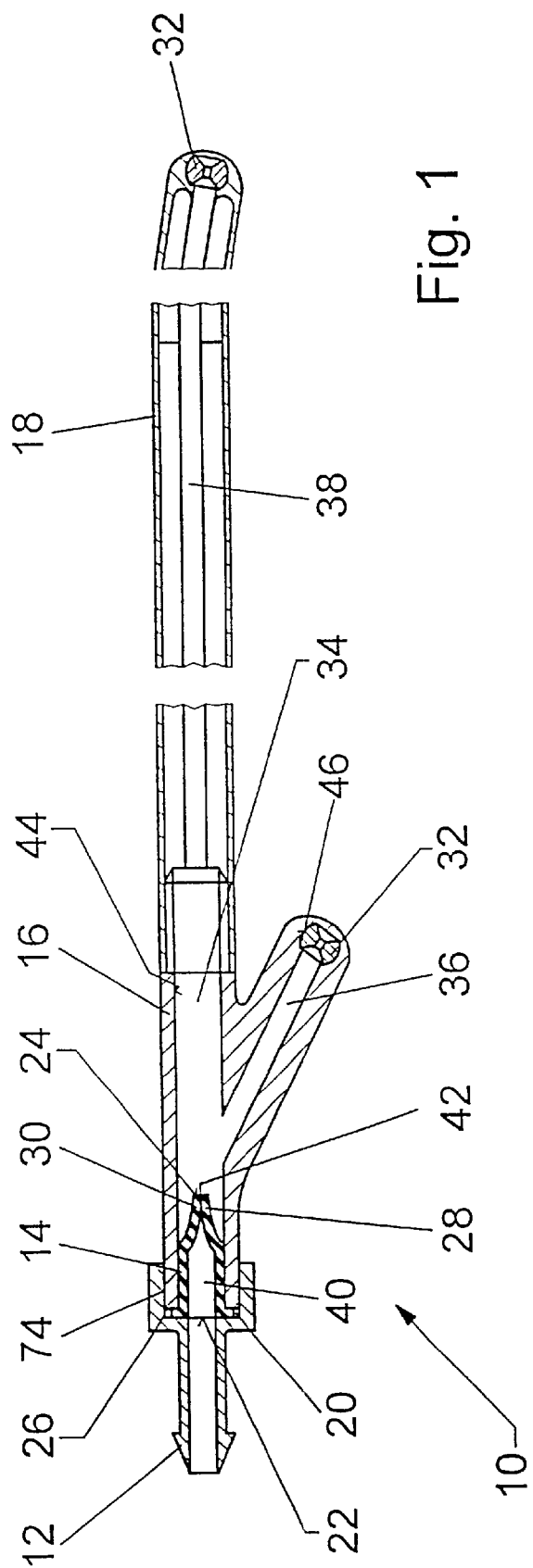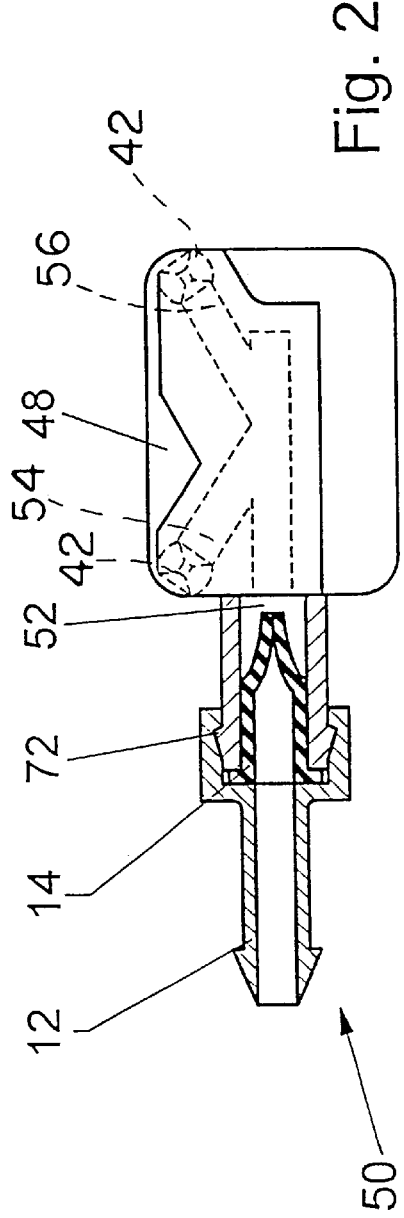

SPRAY NOZZLE FOR A WINDSCREEN WASHING SYSTEM

PRIOR ART

Figure 3:
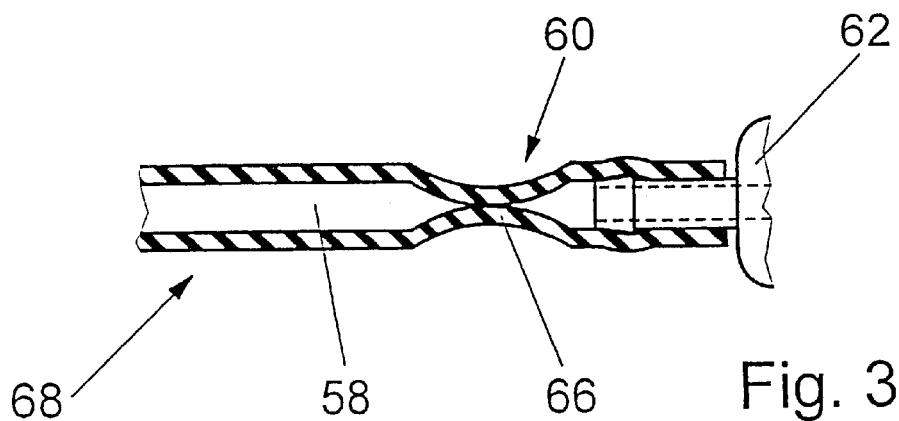

The invention is based on a spray nozzle for window or glass washer systems as generically defined by the preamble to claim 1.

As a rule, known window or glass washer systems for vehicles are used in conjunction with wipers. For headlights, it is sufficient in some cases to use them without wipers, but with a higher pressure. These systems are actuated if the moisture from precipitation is insufficient to clean the vehicle glass. They include a water tank, spray nozzles, and a pump that pumps water, with which cleaning and antifreeze agents are mixed under some circumstances, under pressure out of the water tank via water lines to the spray nozzles. As a rule, the spray nozzles are secured to some part of a vehicle body, such as a hood over the engine compartment, a window frame, or the like.

It is also already known to secure spray nozzles as additional components on the wiper blade and thus to distribute the spraying water over the wiping region directly with a short stream length. Since the spraying water is concentrated on a region in the vicinity of the wiper blade and is wiped off again in the briefest time by the wiping motion, the view is hindered only briefly by the spraying water applied. A disadvantage of such systems is that the effects of weather, especially hail and extreme sunshine, have a major effect on the flexible parts of this arrangement, which are required for spanning the jointed regions between the wiper arm and the wiper blade. The spray nozzles and water lines that are exposed to the relative wind also freeze up quickly at temperatures below the freezing point, unless enough antifreeze is added to the water. As a rule, thawing the frozen water lines and spray nozzles again can be done only with major effort.

Expediently, the spray nozzle has an outward-opening check valve, which prevents the water line from running empty if the washer system goes unused for relatively long periods. These check valves for the most part operate on the order of the spring and ball system. They are intended to prevent the water line from becoming only partly filled, impeding the heat transfer from the heating element to the water. Furthermore, water residues can become locally overheated and can evaporate. This causes calcium deposits that over the course of time plug up the narrow conduits in the spray nozzle.

A spray nozzle with an elastically widenable nozzle part is also known, from Bosch Handelsprogramm 97/98 [Trade Program 97/98], page 29, which opens by the pressure of the washing water and closes if pressure is absent. The spray port is formed by liplike parts of the nozzle part, which in the closed state rest on one another. Although here the entire washing water volume is enclosed as far as the spray port, still it is difficult to achieve a defined geometry and direction of the spray stream.

In an earlier German patent application, DE 198 15 171.3, a wiper arm is described on whose hinge element, or on a wiper rod integrally joined to the hinge element, spray nozzles are disposed. The spray nozzles are located in a nozzle body, which is accommodated in a bulge of the hinge element with a spray opening for the spray stream, or is clipped, protruding downward, in a lateral mount on the wiper rod. It is also possible for two nozzle bodies to be provided, which are joined together by a rigid or flexible connecting piece. The nozzle bodies can be replaced easily and are well protected against environmental factors.

There are also simple versions in which the nozzle bodies are produced integrally and as an injection molded plastic part. The nozzles are either supported fixedly in the nozzle body or are adjustably supported via a ball seat. By means of the nozzle bodies distributed on the wiper arm, the spraying water is well distributed over the wiping region, especially if a spray stream is aimed directly in front of the wiper blade in a lower region. Because as a result of the arrangement the stream lengths are short, the relative wind can have only little effect on the spraying water distribution even at a relatively high vehicle speed.

ADVANTAGES OF THE INVENTION

According to the invention, the spray nozzle has a closure element, which is disposed in the water inlet upstream of a fixed spray opening. By the pressure of the washing water, the elastic admission opening opens, and the washing water is sprayed onto the vehicle window or other glass through the fixed spray port. The fixed spray port guarantees a stable stream geometry, along with a replicable stream direction to suit the adjustment, and optimal impact points. Since the closure element takes up only a little installation space, it can be located in the immediate vicinity of the spray port. It prevents washing water and antifreeze from escaping from the washer system in the pressureless state. Since the closure element is accommodated in the water conduit of the nozzle body and is thus protected, then together with the nozzle body it can even be placed at exposed points, without the risk of becoming damaged.

If one water line supplies a plurality of spray ports, then it is expedient to dispose the closure element upstream of the branch of the water conduits. In one feature of the invention, the closure element, on its leading edge, has an edge with which it is retained between the nozzle body and a separate connection piece for the water line. The connection piece is joined in pressure-tight fashion to the nozzle body, for instance positively by clips or detents or materially by adhesive bonding, welding, and in particular ultrasonic welding. The elastic edge of the closure element can act as a seal in the process. On the trailing edge, the closure element has liplike wall parts, which in the pressureless state rest tightly against one another and close the admission conduit.

An even simpler variant of the invention provides a part of the water line as the closure element; this part is elastic in a region shortly upstream of the connection to the nozzle body and is shaped on the inside such that it closes the water line at this point. A water pressure generated by the pump of the window or glass washer system presses the elastic part of the water line outward at this point and thus uncovers an opening for the spraying water. In a further variant of the invention, a spring element presses from outside against the elastic point of the water line and interrupts the flow through it until a defined pressure is achieved. The spring element can be used either by itself or in addition to a special shaping of the water line.

DRAWING

Further advantages will become apparent from the ensuing description of the drawing. Exemplary embodiments of the invention are shown in the drawing. The drawing, description and claims include numerous characteristics in combination. One skilled in the art will expediently consider the characteristics individually as well and put them together to make suitable further combinations.

Figure 4:
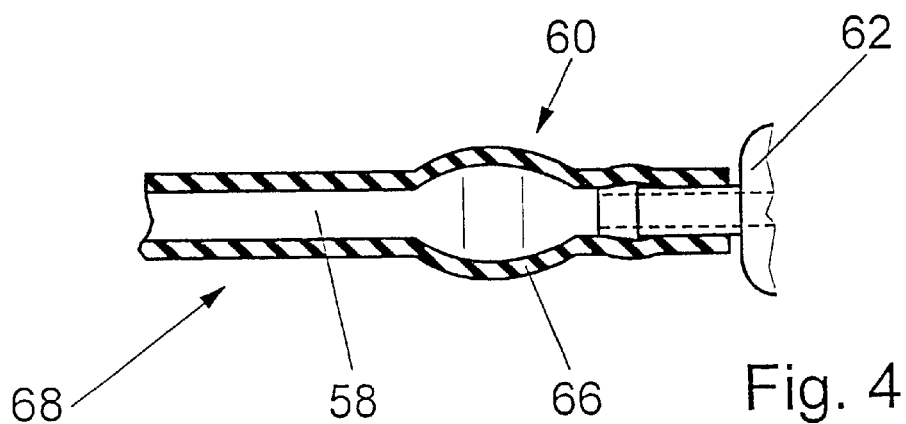
Figure 5:
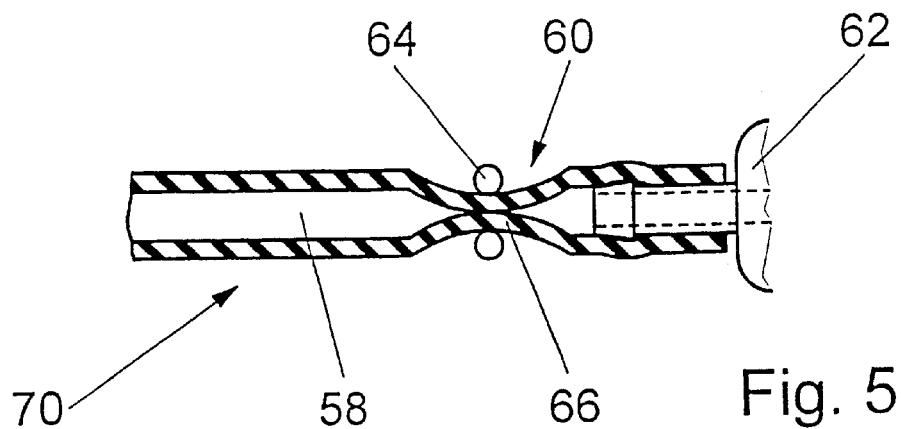

Shown are:

FIG. 1, a longitudinal section through a spray nozzle with a closure element;

FIG. 2, a longitudinal section through a variant of the spray nozzle with a closure element;

FIG. 3, a fragmentary longitudinal section through the water line with the closure element closed;

FIG. 4, a fragmentary longitudinal section through the water line with the closure element open; and FIG. 5, a fragmentary longitudinal section through the water line with an additional spring element.

DESCRIPTION OF THE EXEMPLARY EMBODIMENTS

A spray nozzle 10 of a window or glass washer system substantially comprises a nozzle body 16, which has the nozzles 32, with fixed spray ports 20, and has a closure element 14 (FIG. 1). With the aid of a connection piece 12, the nozzle body 16 communicates with a water line of the window or glass washer system, which line leads to a pump, not shown, and a supply tank. The nozzle body 16 has a water conduit 34, from which spray conduits 36 and 38 branch off to the nozzles 32. The connection piece 12 is secured in pressure-tight fashion to the nozzle body 16, in the version of FIG. 1 by a welded connection 74 and in particular by ultrasonic welding, and in the version of FIG. 2 by a clip connection 72.

The closure element 14 is disposed in the water conduit 34 of the nozzle body 16. It is inserted into the end of the nozzle body 16 toward the connection piece 12. On its leading edge 22, the closure element 14 has an edge 26, with which it is retained between the nozzle body 16 and the connection piece 12 for the water line. The edge 26 can simultaneously act as a seal. On the trailing edge 24, the closure element 14 has lips 28 and 30, which in the pressureless state rest on one another and close an admission conduit 40.

In the spray operation, a water pressure generated by the pump opens the elastic admission opening of the closure element 14. The water is thus forced from the leading edge 22 into the admission conduit 40 of the closure element 14 and presses against the inside of the lips 28 and 30, which in the closed state rest sealingly on one another, until they are completely opened. The initially flat lips 28 and 30 bulge out slightly, creating an opening 42. The outer stop of the lips 28 and 30 is formed by the wall 44 of the water conduit 34 in the nozzle body 16. When the pump is turned off, the water pressure drops, and an intrinsic tension defined by the geometry and elasticity of the closure element 14 returns the lips 28 and 30 to the position of repose, so that the opening 42 narrows again, and the admission conduit 40 is closed.

In the spray process, the spraying water flows through the opened lips 28 and 30 of the closure element 14, through the water conduit 34, and on into the spray conduits 36 and 38, which each have a nozzle 32 on their respective ends. The nozzles 32 are retained in a ball seat 46 and are adjustable within a limited range. The spray conduit 38 leads through a tube 18 screwed onto the nozzle body 16. By means of different lengths of the tube 18, different spacings between the nozzles 32 can be created.

FIG. 2 shows a spray nozzle 50 with a nozzle body 48. This variant again has a closure element 14 in the form of a check valve. The nozzle body 48 has a water conduit 52, from which at least two spray conduits 54 and 56 of equal length branch off in different directions. This variant is especially suitable for window or glass washer systems that require small spacings between the nozzles 32. The spray streams can be adjusted within a limited range, since the nozzles 32 are retained in a ball seat 42.

In a further variant of a spray nozzle 68, the water line 58 itself acts as the closure element. At least in a region shortly upstream of the connection piece 12 of the nozzle body 62, the water line 58 has a deformation, an elastically widenable closure point 60, that is closed in the pressureless state (FIG. 3). The constriction 60 is created by forming, such as by hot stamping or similar methods. In the process, the wall 66 of the water line 58 is shaped on the inside in such a way that no further flow of water through this region can occur. In the spray operation, water flows, at a pressure generated by the pump, from the supply tank through the water line 58 toward the constriction 60 and forces the elastic wall 66 outward, creating an opening for the spraying water flowing through.

A spray nozzle 70 (FIG. 5) has as a variant a spring element 64, which is mounted on the outside of the constriction 60 and generates a defined closing pressure. The spring element 64 can be used either alone or in addition to a plastic deformation of the water line. (FIG. 5)

What is claimed is:

1. A spray nozzle (10, 50, 68, 70) for a window or glass washer system, comprising a closure element (14) with an elastic admission opening, said admission opening opened by pressure of washing water, wherein the closure element (14) is disposed in a water inlet upstream of a nozzle (32) having a fixed spray port (20), and further comprising a water line and a connection piece (12), said water line being elastic at least in a region upstream of said connection piece (12), and wherein said water line forms a closure element (60).

2. The spray nozzle (10, 50) of claim 1, wherein the closure element (14) is inserted into a nozzle body (16) having a plurality of nozzles (32) at the connection piece (12) for a water hose, said water hose having an admission conduit (40) on a trailing side (24), and wherein said admission conduit (40) on the trailing side (24) is closed in a pressureless state by liplike wall parts (28, 30).

3. The spray nozzle (10, 50) of claim 2, wherein on a leading edge (22), the closure element (14) has an edge (26), wherein said closure element is retained between the nozzle body (16) and the separate connection piece (12) for the water line.

4. The spray nozzle (10, 50) of claim 3, wherein the closure element (14) is joined positively by a clip connection (72) or materially via a welded connection (74) to the nozzle body (16).

5. The spray nozzle (70) of claim 1, wherein the water line (58) is compressed by a spring element (64).

\* \* \* \* \*